(12) United States Patent
Miao et al.

(10) Patent No.: US 10,707,657 B2
(45) Date of Patent: Jul. 7, 2020

(54) AUTOMATIC REMOVING APPARATUS FOR RING MAIN UNIT CABLE HEAD

(71) Applicant: Shenzhen Longgong Power Supply Service Co., Ltd., Shenzhen (CN)

(72) Inventors: Baofeng Miao, Shenzhen (CN); Fashan Yang, Shenzhen (CN); Songpeng Xie, Shenzhen (CN); Shan Liu, Shenzhen (CN); Longwei Huang, Shenzhen (CN); Yuliang Li, Shenzhen (CN); Chuzhong Xu, Shenzhen (CN); Lei Li, Shenzhen (CN); Wenbo Li, Shenzhen (CN); Yingju Wang, Shenzhen (CN)

( * ) Notice: Subject to any disclaimer, the term of this patent is extended or adjusted under 35 U.S.C. 154(b) by 359 days.

(21) Appl. No.: 15/836,911

(22) Filed: Dec. 11, 2017

(65) Prior Publication Data

US 2019/0181624 A1 Jun. 13, 2019

(51) Int. Cl.
 *H02G 1/12* (2006.01)
(52) U.S. Cl.
 CPC .............. *H02G 1/12* (2013.01); *H02G 1/1224* (2013.01); *H02G 1/1246* (2013.01)
(58) Field of Classification Search
 CPC ....... H02G 1/12; H02G 1/1224; H02G 1/1246
 USPC ................................................. 173/217, 216
 See application file for complete search history.

(56) References Cited

U.S. PATENT DOCUMENTS

2008/0083121 A1* 4/2008 Cziraky .................... B26B 7/00
30/277.4

FOREIGN PATENT DOCUMENTS

CN 205992703 U * 3/2017

* cited by examiner

*Primary Examiner* — Michelle Lopez
(74) *Attorney, Agent, or Firm* — Prakash Nama; Global IP Services, PLLC

(57) ABSTRACT

The present invention discloses an automatic removing apparatus for ring main unit cable head which comprises an outer casing formed by a handle and an outer casing body; the outer casing body has a rear end which is fixedly connected to the handle; the outer casing body has a front end which is fixedly connected to a connecting head; a motor and a control chip connected to the motor are disposed inside the outer casing; the control chip is electrically connected to a battery for supplying power to the control chip and the motor; the motor has a rotation shaft which drives rotation of a main gear; the connecting head is fixedly connected to a removing rod; a follower gear which meshes with the main gear is fixedly disposed at the connecting head for rotating around the main gear. The present invention has the advantageous effect of enhancing working efficiency.

8 Claims, 2 Drawing Sheets

AUTOMATIC REMOVING APPARATUS FOR RING MAIN UNIT CABLE HEAD

BACKGROUND OF THE INVENTION

The present invention relates to electricity technological field and more particularly to an automatic removing apparatus for ring main unit cable head.

When performing maintenance to a cable terminal head in electric equipment, it is required to remove the protective shield on the cable head. Traditionally, a tool such as a flat blade screwdriver is inserted between the cable head protective shield and the insulator or stress cone. However, such tool causes permanent damages to the electric equipment easily. Damages to the equipment not only increases equipment replacement costs, but also causes power failure due to damages to equipment parts, resulting in larger economical loss.

Chinese utility model patent number CN205992703U discloses a removing apparatus for insulated protective shield for ring main unit which comprises a handle and a removing rod for manually removing ring main unit cable head. It overcomes the situation where there is no tool for removing the cable head, but it is manually operated and has lower working efficiency. It is required to manually rotate for one round first before the cable head could be removed.

BRIEF SUMMARY OF THE INVENTION

The present invention provides a removing apparatus which has high working efficiency as follows.

An automatic removing apparatus for ring main unit cable head which comprises an outer casing formed by a handle and an outer casing body; the outer casing body has a rear end which is fixedly connected to the handle; the outer casing body has a front end which is fixedly connected to a connecting head; a motor and a control chip connected to the motor are disposed inside the outer casing; the control chip is electrically connected to a battery for supplying power to the control chip and the motor; the motor has a rotation shaft which drives rotation of a main gear; the connecting head is fixedly connected to a removing rod; a follower gear which meshes with the main gear is fixedly disposed at the connecting head for rotating around the main gear.

The connecting head has a hollow structure in form of a gel guiding tube; the connecting head is movably connected to a head portion of the removing rod; the gel guiding tube is in through connection with the removing rod.

The removing rod has a hollow structure; a plurality of gel discharging openings are provided at a rear end of the removing rod; a front end of the removing rod connects to the connecting head.

A silica gel tank made of elastic plastic is disposed inside the outer casing for storing silica gel; a gel outlet of the silica gel tank is connected to the removing rod via a soft tube; the silica gel tank is enclosed by an inflatable airbag.

The silica gel tank further comprises a gel inlet disposed on the outer casing which communicates with the silica gel tank inside the outer casing for filling in silica gel; a cover is provided at the gel inlet.

Inflation of the inflatable airbag is powered by the motor; when the inflatable airbag is inflated, the silica gel tank is squeezed to convey silica gel to the removing rod.

There are two types of removing rods, namely Type A removing rod and Type B removing rod; Type A removing rod has a rear end which is straight in shape; Type B removing rod has a rear end which is in hook shape.

The present invention has the advantageous effect of enhancing working efficiency.

DETAILED DESCRIPTION OF THE INVENTION

The present invention will be clearly and comprehensively described with an embodiment and the accompanying drawings. It is obvious that the embodiment described herein is only one of the embodiments of the present invention but not all embodiments of the present invention. Based on the embodiment in the present invention, all other embodiments derived by a person skilled in the art without any inventive labor falls within the scope of the present invention.

Figure 1:
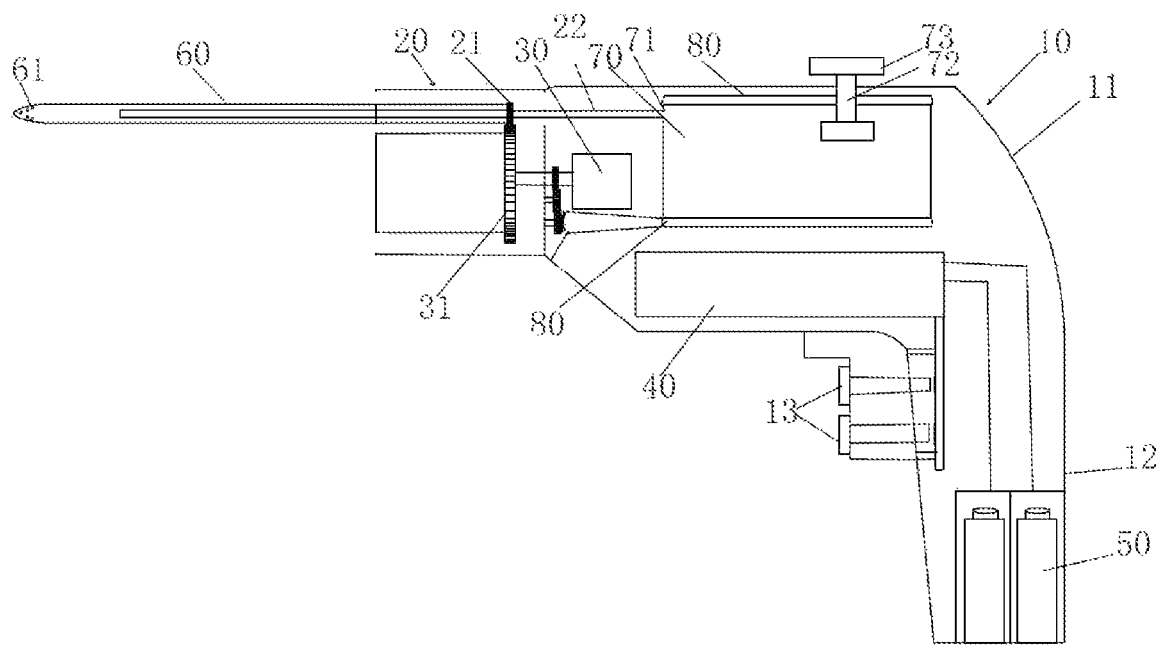
FIG. 1 is a schematic view showing the apparatus of an embodiment of the present invention.
Figure 2:
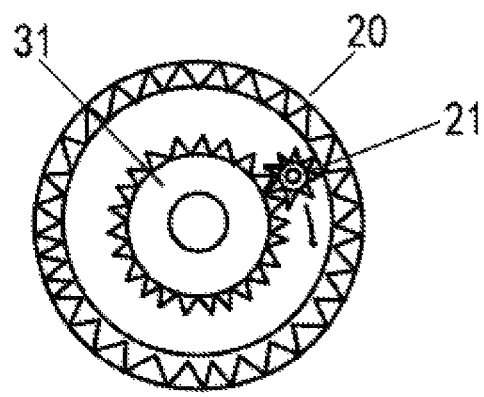
FIG. 2 is a schematic view of the connecting head of the apparatus of FIG. 1.

As illustrated in FIGS. 1-2, the automatic removing apparatus for ring main unit cable head comprises an outer casing 10 formed by a handle 11 and an outer casing body 12. The outer casing body 12 has a rear end which is fixedly connected to the handle 11. The outer casing body 12 has a front end which is fixedly connected to a connecting head 20. A motor 30 and a control chip 40 connected to the motor are disposed inside the outer casing. The control chip 40 is electrically connected to a battery 50 for supplying power to the control chip and the motor. The motor has a rotation shaft which drives rotation of a main gear 31. The connecting head 20 is fixedly connected to a removing rod 60. A follower gear 21 which meshes with the main gear 31 is disposed at the connecting head for rotating around the main gear.

The connecting head 20 has a hollow structure in form of a gel guiding tube 22. The connecting head is movably connected to a head portion of the removing rod. The gel guiding tube 22 is in through connection with the removing rod 60. The connecting head may be provided with a slot for the removing rod to insert into. The slot is in through connection with the gel guiding tube. Another end of the gel guiding tube 22 is connected to a gel outlet of a silica gel tank.

The removing rod 60 has a hollow structure. A plurality of gel discharging openings are provided at a rear end of the removing rod. A front end of the removing rod connects to the connecting head 20. There are two types of removing rods, namely Type A removing rod and Type B removing rod. Type A removing rod has a rear end which is straight in shape; Type B removing rod has a rear end which is in hook shape; they are applicable for different positions of the cable head.

A silica gel tank 70 made of elastic plastic is disposed inside the outer casing for storing liquid silica gel. A gel outlet 71 of the silica gel tank is connected to the connecting head 20 via a soft tube. The connecting head is in through connection with the removing rod. The silica gel tank 70 further comprises a gel inlet 72 disposed on the outer casing 10 which communicates with the silica gel tank 70 inside the outer casing for filling in silica gel. A cover 73 is provided at the gel inlet. The cover 73 is closed after filling in of liquid silica gel is completed to prevent spilling out of the liquid silica gel. The silica gel tank 70 is enclosed by an inflatable airbag 80. Inflation of the inflatable airbag 80 is powered by the motor. When the motor rotates, the inflatable airbag 80 is inflated and the silica gel tank 70 is squeezed to convey liquid silica gel to the removing rod.

Figure 3:
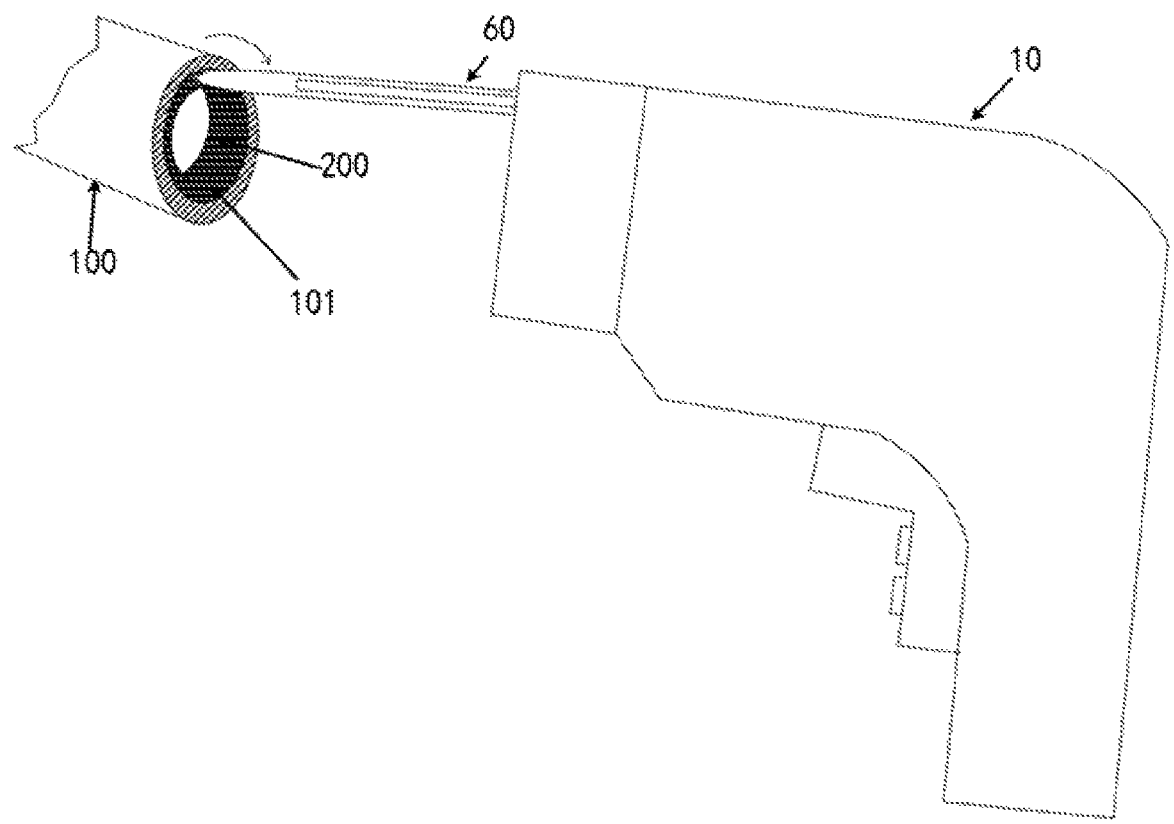
FIG. 3 is a reference view showing the state of use of the embodiment of the present invention.

With reference to FIGS. 1 and 2 and as illustrated in FIG. 3, a state where the apparatus of the present invention is applied at the ring main unit cable head is shown. When in use, press a button 13 on the handle, thus activating a switch to transmit electrical signal to the control chip 40. After the control chip 40 receives the signal, the motor 30 is driven to rotate. The main gear 31 of the motor 30 drives the follower gear 21 of the connecting head 20 to rotate. As the connecting head 20 is connected to the removing rod 60, when the motor rotates, the removing rod 60 rotates one round around the main gear 31.

There are a plurality of buttons 13, including one for controlling rotation of the removing rod and one for controlling inflation of the airbag. Pressing the button will activate an inflation switch; after the control chip 40 receives the electrical signal from the inflation switch, the motor 30 is driven to inflate the inflatable airbag 80. The inflatable airbag 80 squeezes the silica gel tank 70 for squeezing the liquid silica gel to the hollow structure of the removing rod 60 and for discharge from the gel discharging openings 61.

During use, a suitable removing rod is replaced. Taking Type A removing rod which is a straight removing rod as an example, first press the button to activate the inflation switch to inflate the inflatable airbag to squeeze the silica gel tank 70 so that the liquid silica gel in the silica gel tank is conveyed from the gel outlet, the soft tube, the gel guiding tube and the hollow structure of the removing rod and lastly discharged from the gel discharging openings. The handle and the outer casing body are each held by one hand to insert the rear portion of the removing rod between the cable head protective shield and the insulator or stress cone. Under the lubricating action of the liquid silica gel, the internal structure of the cable head would not be damaged. After completion, press the button to activate the switch; after the control circuit board 40 receives the signal, the motor is activated to drive the main gear to rotate. The follower gear which meshes with the main gear then rotates one round around the main gear, and the removing rod also rotates one round between the cable head protective shield 100 and the insulator 200 or stress cone 200. At this time, the removing rod causes a layer of liquid silica gel to be coated between the cable head protective shield and the insulator or stress cone, and also enlarges a gap 101 therebetween. After rotating one round, the removing rod may be pulled out, and the cable head protective shield may be pulled out by hand easily.

Although an embodiment of the present invention has been shown and described, to a person skilled in the art, any change, modification, substitution or variation not departing from the principle and spirit of the present invention may be made to the embodiment, and the scope of protection of the present invention is only limited by the accompanying claims and equivalents thereof.

What is claimed is:

1. An automatic removing apparatus for ring main unit cable head which is characterized in that: it comprises an outer casing formed by a handle and an outer casing body; the outer casing body has a rear end which is fixedly connected to the handle; the outer casing body has a front end which is fixedly connected to a connecting head; a motor and a control chip connected to the motor are disposed inside the outer casing; the control chip is electrically connected to a battery for supplying power to the control chip and the motor; the motor has a rotation shaft which drives rotation of a main gear; the connecting head is fixedly connected to a removing rod; a follower gear which meshes with the main gear is fixedly disposed at the connecting head for rotating around the main gear.

2. The automatic removing apparatus for ring main unit cable head as in claim 1, characterized in that: the connecting head has a hollow structure in form of a gel guiding tube; the connecting head is movably connected to a head portion of the removing rod; the gel guiding tube is in through connection with the removing rod.

3. The automatic removing apparatus for ring main unit cable head as in claim 1, characterized in that: the removing rod has a hollow structure; a plurality of gel discharging openings are provided at a rear end of the removing rod; a front end of the removing rod connects to the connecting head.

4. The automatic removing apparatus for ring main unit cable head as in claim 1, characterized in that: a silica gel tank made of elastic plastic is disposed inside the outer casing for storing silica gel; a gel outlet of the silica gel tank is connected to the removing rod via a soft tube; the silica gel tank is enclosed by an inflatable airbag.

5. The automatic removing apparatus for ring main unit cable head as in claim 4, characterized in that: the silica gel tank further comprises a gel inlet disposed on the outer casing which communicates with the silica gel tank inside the outer casing for filling in silica gel; a cover is provided at the gel inlet.

6. The automatic removing apparatus for ring main unit cable head as in claim 4, characterized in that: inflation of the inflatable airbag is powered by the motor; when the inflatable airbag is inflated, the silica gel tank is squeezed to convey silica gel to the removing rod.

7. The automatic removing apparatus for ring main unit cable head as in claim 1, characterized in that: there are two types of removing rods, namely Type A removing rod and Type B removing rod; Type A removing rod has a rear end which is straight in shape; Type B removing rod has a rear end which is in hook shape.

8. The automatic removing apparatus for ring main unit cable head as in claim 1, characterized in that: a button for controlling rotation of the motor is disposed on the outer casing at the handle.

* * * * *